United States Patent
Tondolo (10) Patent No.: US 7,533,589 B2
(45) Date of Patent: May 19, 2009

(54) MOTION CONVERTER

(75) Inventor: Flavio Tondolo, Stezzano (IT)

(73) Assignee: Control Components, Inc., Rancho Santa Margarita, CA (US)

( * ) Notice: Subject to any disclaimer, the term of this patent is extended or adjusted under 35 U.S.C. 154(b) by 304 days.

(21) Appl. No.: 11/419,673

(22) Filed: May 22, 2006

(65) Prior Publication Data

US 2007/0266807 A1    Nov. 22, 2007

(51) Int. Cl.
*F16H 21/28* (2006.01)
*F16H 21/32* (2006.01)

(52) U.S. Cl. .................................... 74/53; 74/56; 74/49

(58) Field of Classification Search ............... 74/25, 74/47, 48, 49, 53, 56, 567, 569
See application file for complete search history.

(56) References Cited

U.S. PATENT DOCUMENTS 3,633,238 A * 1/1972 Parker .................... 15/250.21
4,285,499 A * 8/1981 Zukausky .................. 251/229
4,527,769 A * 7/1985 Stogner et al. .............. 251/14

* cited by examiner

*Primary Examiner*—Richard W L Ridley
*Assistant Examiner*—Terence Boes
(74) *Attorney, Agent, or Firm*—Stetina Brunda Garred & Brucker (57) ABSTRACT

Provided is a motion converter which comprises a housing, a cam plate reciprocal to the housing, a lower link and an upper link. The cam plate has a groove which extends diagonally across the width thereof. The lower link is pivotably mounted to the housing and has a cam pin and a slot formed at a free end thereof. The cam pin is engageable to the groove of the cam plate. The upper link is also pivotably mounted to the housing in offset relationship to the lower link. A free end of the upper link has a link pin which is engageable to the slot. The motion converter is configured such that the lower link pivots in response to slidable movement of a cam pin within the groove during reciprocation of the cam plate. The upper link is configured to pivot in response to the slidable movement of the link pin within the slot during pivoting in a lower link.

20 Claims, 5 Drawing Sheets

MOTION CONVERTER

CROSS-REFERENCE TO RELATED APPLICATIONS

Not Applicable

STATEMENT RE: FEDERALLY SPONSORED RESEARCH/DEVELOPMENT

Not Applicable

BACKGROUND

The present invention relates generally to valves and more particularly, to a rotary-to-linear motion converter that is specifically adapted for proportional operation of an output shaft in response to linear movement of a cam plate.

Well known in the prior art are linear-to-rotary motion converter mechanisms that are adapted to convert linear motion of a device such as an actuator into a proportional amount of rotational motion. Such prior art linear-to-rotary motion converters may include rack and pinion mechanisms as well as various types of trunnion and clevis devices.

In addition, linear-to-rotary motion converter mechanisms are a type of control component that are used in a wide variety of applications. For example, motion converters are widely used in hydraulic and pneumatic systems in the coal, oil and gas industries. Furthermore, power plants, oil and gas refineries, and pulp and paper plants may also employ such linear-to-rotary motion converter mechanisms. As is well known, the operating environment for such applications is typically of a severe nature.

For example, certain control components that are utilized in coal, oil and gas production are typically subjected to abrasives such as dirt and grit and may be exposed to certain harmful processing materials which can infiltrate and degrade wear-sensitive components over time. Ideally, such control components must be capable of operating in a reliable manner over an extended period of time regardless of the environment.

Unfortunately, many linear-to-rotary motion converters of the prior art may be comprised of an arrangement of interconnected mechanical components such as belts, pulleys and other components that may eventually stick, bind, bend and ultimately fail over time due to the build-up of dirt, grit and oil. As can be seen, the failure of control components, such as motion converters, in severe service environments may ultimately compromise the overall operability of an entire system.

In addition, because of the configuration of such prior art motion converters, the assembly, maintenance, repair and substitution of certain parts included therewith may require a relatively high degree of technician skill. As such, prior art motion converters are understood to be undesirably complex which may contribute to relatively high assembly and operating costs. Finally, such motion converters of the prior art are typically designed to provide a specific amount of rotational motion for a given amount of linear input as may be required for a particular system. In this regard, such prior art motion converters are not understood to allow for flexibility in a variety of operating parameters.

For example, for a given system, it may be desirable to change the amount of rotational output of a motion converter for a fixed amount of linear input. Unfortunately, most motion converters of the prior art are not understood to provide such flexibility. Therefore, it may be necessary to replace the entire motion converter in order to change the relationship between linear input and rotational output for a given system to which the motion converter is installed.

As can be seen, there exists a need in the art for a linear-to-rotary motion converter that is of simple construction in order to facilitate manufacturing and maintenance thereof. Furthermore, there exists a need in the art for a motion converter that is adapted to reliably operate in severe service environments such as the environments common to the coal, oil, and gas production as well as power industries.

In this regard, there exists a need in the art for a motion converter that is capable of operating reliably in a relatively dirty environment without compromise to the overall system in which it is installed. Also, there exists a need in the art for a motion converter in which the desired amount of rotation in response to a given linear input may be readily changed. Finally, there exists a need for a motion converter that is universally adaptable to a variety of output components.

BRIEF SUMMARY

The present invention is specifically adapted to address the above-mentioned needs associated with motion converters of the prior art. More specifically, the present invention provides a linear-to-rotary motion converter that is specifically adapted to translate linear movement of a device, such as a valve, into rotary motion of another device, such as a positioner. However, it is contemplated that the motion converter of the present invention may be adapted to translate linear motion into rotary motion for any system or device.

The motion converter comprises a housing, an elongate cam plate, a lower link, and an upper link. The cam plate is linearly reciprocatably through the housing. A groove is formed in the cam plate and at least a portion of the groove extends diagonally across a width of the cam plate. The lower link is pivotally mounted to the housing and is disposed above the cam plate. Notably, a cam pin extends downwardly from the lower link and is configured to be cooperatively engaged to the groove such that the cam pin slides therealong. The upper link is also pivotally mounted to the housing and is disposed above the lower link. The lower link includes a lower link shaft that is journaled into the housing while the upper link includes an upper link shaft that is also journaled into the housing but is disposed in offset relationship to the lower link shaft.

The lower link, cam pin and lower link shaft form a position detection assembly wherein the lower link is pivotable about the lower link shaft as the cam pin slides along the diagonal portion of the groove during reciprocation of the cam plate. In this regard, the upper link senses the lateral (i.e., side-to-side) position of the diagonal portion of the groove. The upper link includes a link pin which extends downwardly therefrom and is cooperatively engaged to a slot formed in a free end of the lower link. In addition, the upper link includes an upper link shaft which is pivotally mounted to the housing and which forms an angle amplification assembly.

The angle amplification assembly amplifies the angular movement of the lower link as the cam pin slides along the diagonal portion of the groove. The amount of angular rotation at the lower link is amplified at the upper link due to the generally shorter length of the upper link relative to the lower link and the offset relationship between the shafts of the lower and upper links. Advantageously, such an arrangement results in a simple means by which the rotation of the lower link is amplified at the upper link. Rotation of the upper link may be translated to any suitable device by means of an output shaft and/or a coupling stem mounted on the upper link shaft which extends outwardly from the housing.

It will also be appreciated that the arrangement of the motion converter provides a simple means by which a desired amount of angular rotation may be adapted for any particular system by simply substituting a cam plate having a different groove profile. The cam plate may be substituted by simply removing and replacing the cam plate with a different cam plate having a groove with a different configuration (i.e., different diagonal orientation and/or length) in order to achieve different rotational characteristics at the output shaft.

Regarding the operation of the motion converter, the cam plate is reciprocal in a linear direction along a longitudinal axis relative to the housing. The groove may be oriented with respect to the upper and lower links such that a rotation of approximately 0°-90° may be achieved at the upper link shaft upon full stroke of the cam plate. Accordingly, an approximate rotation of about 45° may be facilitated upon a half stroke of the cam plate. Various other rotations (e.g., 0-60°) may be facilitated by substituting cam plates having appropriate groove configurations.

In order to minimize transverse or lateral movement of the cam plate during its reciprocation through the housing, a pair of spaced plate bearings may be journaled into the housing and disposed on opposite sides of the cam plate in rolling contact with sidewalls of the cam plate. Such an arrangement allows for lateral or transverse movement of the cam plate at the cam plate ends. However, because the plate bearing are aligned with the cam pin, lateral movement of the plate ends results in only rotational movement thereof about the cam pin. In this manner, little, if any, lateral movement or displacement of the cam plate occurs at the cam pin which would otherwise adversely affect rotational accuracy at the coupling stem or upper link.

It is contemplated that the pair of plate bearings are generally aligned with the cam pin during its lateral range of motion as the cam pin moves within the diagonal portion of the groove. A bearing lip may be provided circumferentially around an upper edge of each one of the plate bearings to prevent upward vertical movement (i.e., floating) of the cam plate during its linear reciprocation.

The motion converter may further include a friction pad upon which the cam plate may slide in order to reduce sliding friction. It is contemplated that the friction pad is fabricated of a non-metallic material which preferably has a low coefficient of friction. In this regard, Teflon or other suitable materials may be utilized for the friction pad.

In order to prevent backlash of the motion converter, a torsion spring may be inserted between the housing and upper link in order to rotatably bias the cam pin against one of the groove sidewalls in order to prevent lateral movement of a cam pin within the groove during reciprocation of the cam plate. The effect of the biasing spring may be noticeable during change of directions (i.e., reciprocation) of the cam plate, especially when the cam pin is moving within the diagonal portion of the groove.

BRIEF DESCRIPTION OF THE DRAWINGS

These as well as other features of the present invention will become apparent upon reference to the drawings wherein.

DETAILED DESCRIPTION

Figure 1:
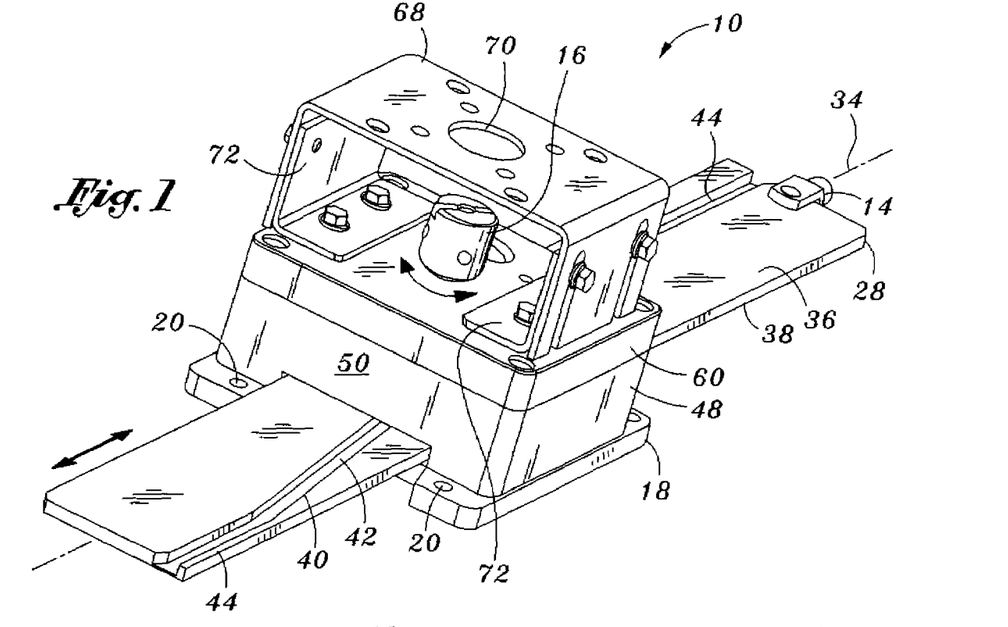
FIG. 1 is a perspective view of a motion converter of the present invention and illustrating a cam plate reciprocatably inserted through a housing and having a yoke mounted to the housing for connection of a positioner via an output shaft.

Referring now to the drawings wherein the showings are for purposes of illustrating the present invention and not for purposes of limiting the same, shown in FIG. 1 is a motion converter 10 of the present invention. The motion converter 10 is configured as a linear-to-rotary motion converter 10 and which may be adapted to translate linear motion of a device, such as a valve, into rotary motion of another device, such as a positioner. Advantageously, the motion converter is specifically arranged to provide a different rotational output for a given linear input by simple substitution of one of the components of the motion converter.

In its broadest sense, the motion converter 10 comprises a housing 48, an elongate cam plate 28, a position detection assembly 94, and an angle amplification assembly 74. The cam plate 28 is configured to be reciprocatably slidable through the housing 48 as shown in FIG. 1. The lower link 96 forms part of the position detection assembly 94 wherein a cam pin 102 extending downwardly from the lower link 96 is slidably engageable along a groove 40 formed in the cam plate 28. In this manner, the lower link 96 is rotatable about a pivot end 86a thereof when the cam pin 102 follows the diagonal portion 42 of the groove 40 during linear movement of the cam plate 28.

The upper link 78 forms part of the angle amplification assembly 74 wherein a downwardly extending link pin 90 is slidable along a slot 104 formed within a free end 88 of the upper link 78. In this manner, the upper link 78 is pivotable about a pivot end 86 thereof and is rotatable through an angular range that is greater than the angular range through which the lower link 96 rotates. Advantageously, this arrangement results in an amplification of the amount of rotation of the lower link 96 relative to the upper link 78. As can be appreciated, the arrangement further provides a simple means by which the desired amount of angular rotation for a particular system may be accommodated simply by substituting a cam plate 28 having a differing groove 40 profile (i.e., differing groove orientation and length).

Referring to FIG. 1, shown is the motion converter 10 having a yoke 68 mounted thereto via a pair of yoke flanges 72 disposed on opposing sides of the housing 48. It is contemplated that the yoke 68 may be utilized for mounting a positioner thereupon and which may be coupled to the motion converter 10 via a yoke aperture 70 formed in the yoke 68, as can be seen in FIG. 1. A stem coupling 16 may be mounted upon an output shaft 76 which extends out of the housing 48. The stem coupling 16 provides a means by which the positioner may be coupled to the motion converter 10. Yokes 68 of varying configurations may be provided and mounted on the housing 48 in order to accept positioners of differing configurations.

The cam plate 28 is reciprocatable through the housing 48 along a direction indicated in FIG. 1 which is generally parallel to a longitudinal axis 34 extending along the cam plate 28. The cam plate 28 has a generally rectangular cross-sectional shape and profile although alternative configurations may be utilized. Importantly, the groove 40 is formed in an upper surface 36 of the cam plate 28. The groove 40 extends at least diagonally across a width of a cam plate 28 and is engaged by the cam pin 102 which follows along the groove 40 in order to effectuate rotation of the lower link 96.

In the configuration shown, the groove 40 is arranged with respect to the upper and lower links 78, 96 such that a rotation of approximately 0°-90° may be achieved on full stroke of the cam plate 28. In addition, an approximate rotation of about 45° is achievable on a half stroke of a cam plate 28 although various rotations may be facilitated by modifying the path of the groove 40. Furthermore, it is contemplated that the groove 40 may have a non-linear arrangement along its diagonal extension across the cam plate 28 in order to achieve a certain rotation profile of the output shaft 76.

For example, it is contemplated that the groove 40 may be configured and oriented to facilitate a 60° rotation of the output shaft 76 upon full stroke of the cam plate 28. Furthermore, various degrees of rotation may be achieved utilizing varying amounts of stroke of the cam plate 28. For example, the rotation of 90° in the output shaft 76 may be facilitated in a stroke of from about two inches to about 24 inches of the cam plate 28 relative to the housing 48. However, the cam plate 28 and, more specifically, the groove 40, may be arranged to provide a predetermined amount of rotation of the output shaft 76 with any amount of stroke of the cam plate 28.

Figure 4:
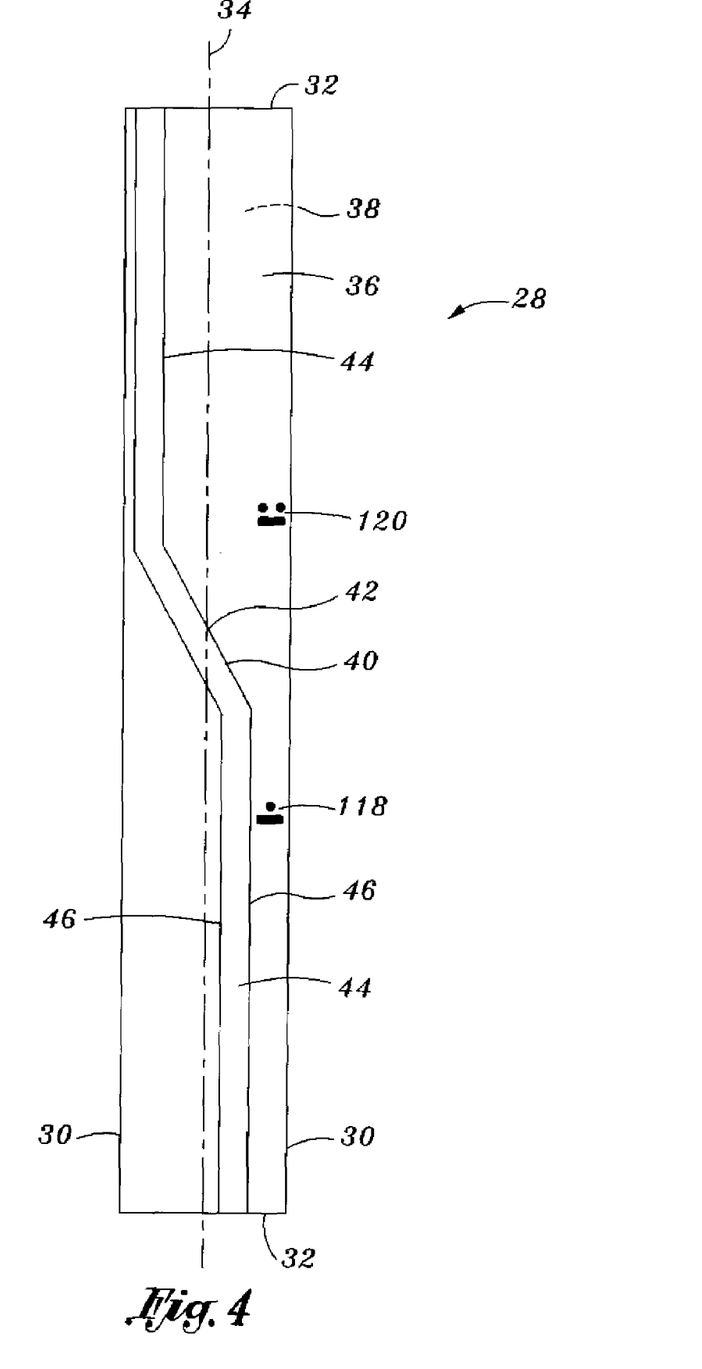
FIG. 4 is a plan view of the cam plate illustrating a groove extending along a length thereof and having a diagonal portion disposed in a mid-portion of the cam plate with a pair of groove straight portions extending from opposing ends of the groove diagonal portion.

Referring particularly now to FIG. 4, shown is the cam plate 28 in a plan view wherein the upper surface 36 is visible and which has the groove 40 formed therein. The groove 40 if formed at least partially into a depth of the cam plate 28 and, as was noted above, includes at least the diagonal portion 42 which extends diagonally across the plate width. The cam plate 28 defines opposing plate ends 32. The groove 40 diagonal portion 42 has opposing diagonal ends.

A pair of straight portions 44 may extend along the cam plate 28 from opposing ends of the diagonal portion 42. Each one of the straight portions 44 preferably extends toward a corresponding nearest one of the plate ends 32. As can be seen, the diagonal portion 42 may be disposed within a mid or center portion of the cam plate 28 although the diagonal portion 42 may alternatively be placed in any location along a length of the cam plate 28. The cam plate 28 includes plate sidewalls 30. The motion converter 10 may further include a pair of plate bearings 112 that are mounted on the housing 48 and which are preferably spaced complimentary to and disposed on opposing sides of the cam plate 28. The plate bearings 112 are also preferably aligned with the cam pin 102 in order to prevent transverse or lateral movement or displacement of the cam plate 28 at the location of the cam pin 102 during reciprocation of the cam plate 28, as will be described in greater below.

Figure 3:
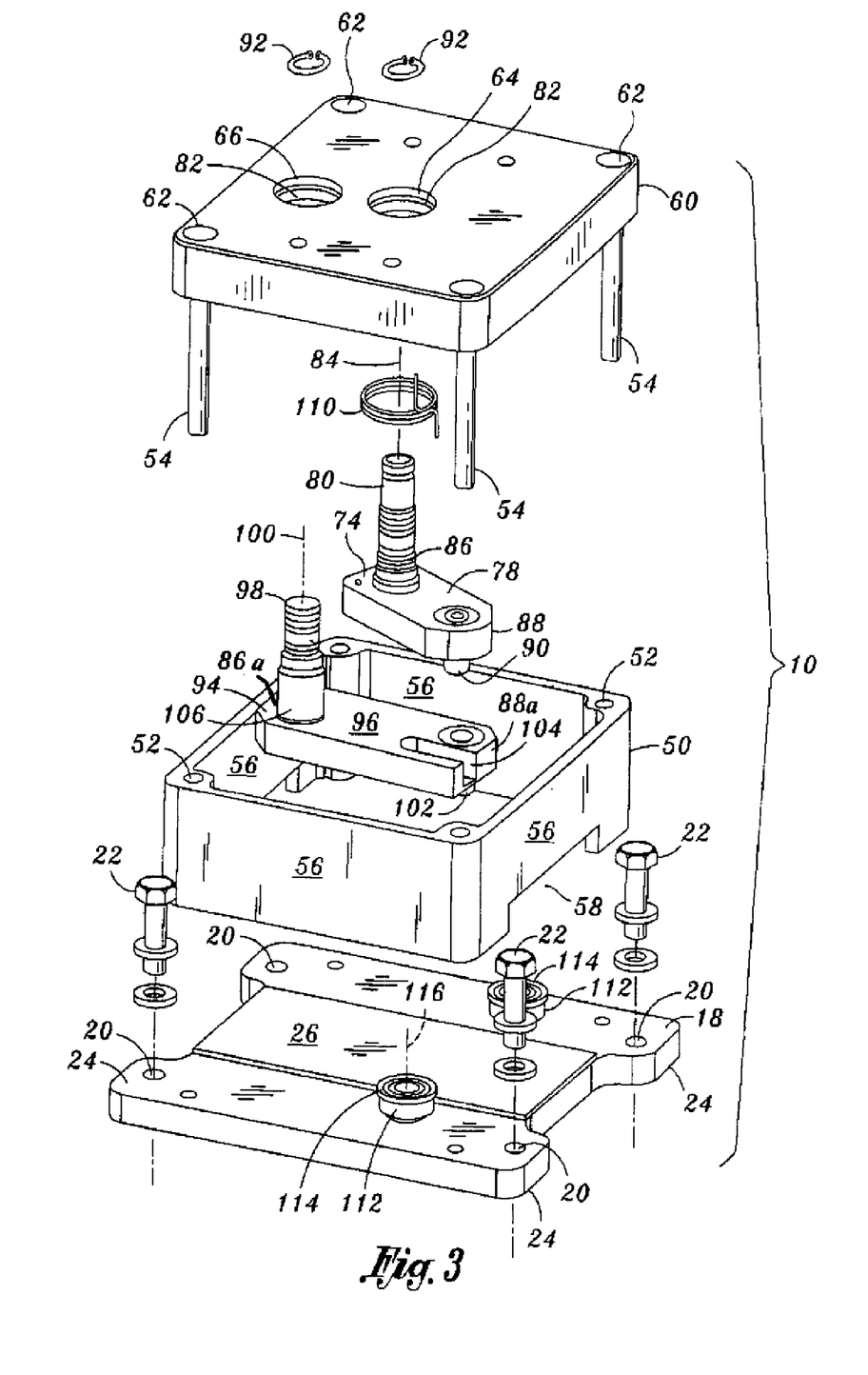
FIG. 3 is an exploded perspective view of the motion converter illustrating the interconnectivity of a lower link, an upper link and the housing and further illustrating a pair of plate bearings rotatably mounted to a lower plate of the housing.

Referring now to FIG. 3, shown is the motion converter 10 is an exploded view illustrating the interconnectivity of the lower link 96, upper link 78 and the housing 48. The housing 48 may be comprised of a lower plate 18, a generally hollow enclosure 50, and an upper plate 60. The hollow enclosure 50 may be generally rectangular in configuration with the lower and upper plates 18, 60 being configured complimentary thereto. The hollow enclosure 50 has an opposing pair of housing openings 58 that are formed in a generally orthogonally arranged set of enclosure sidewalls 56 wherein each of the housing openings 58 is preferably sized complimentary to the cam plate 28 such that the cam plate 28 may be extended through the housing 48 via the housing openings 58. The lower plate 18 may also the mounting surface for the motion converter 10.

Figure 2A:
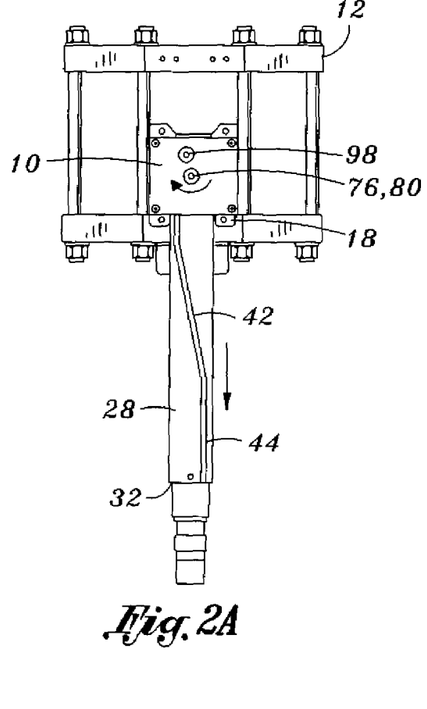
FIG. 2A is a side view of the motion converter mounted to an actuator and being oriented relative thereto such that downward movement of the cam plate effectuates clockwise rotation of the output shaft.
Figure 2B:
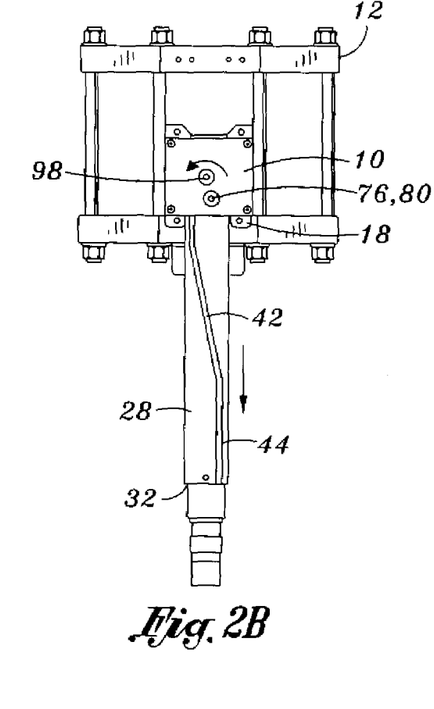
FIG. 2B is a side view of the motion converter mounted to the actuator wherein the motion converter is oriented relative to the actuator such that downward movement of the cam plate effectuates counter clockwise rotation of the output shaft.

For example, as shown in FIG. 2A and 2B, the motion converter 10 may be mounted on the actuator 12 via a set of mounting holes 20 formed in the lower plate 18 and wherein the mounting holes 20 are formed in mounting tabs 24 extending slightly outwardly from the rectangularly shaped lower plate 18. Mounting fasteners 22 may be extended through the mounting holes 20. Each of the mounting fasteners 22 may include a lock washer and a flat washer to prevent inadvertent loosening of the mounting fasteners 22. FIG. 2A shows the motion converter 10 oriented on the actuator 12 with the cam plate 28 being shown in one of its fully extended positions.

The upper link 78 includes an upper link shaft 80. The lower link 96 includes a lower link shaft 98. An upper link shaft 80 and a lower link shaft 98 can be seen mounted in the upper plate 60 of the housing 48 in FIGS. 2A and 2B. In FIG. 2A, the lower link shaft 98 which results in clockwise movement of the upper link shaft 80 during downward movement of the cam plate 28. In FIG. 2B, the lower link shaft 98 is shown disposed below the upper link shaft 80 which results in counter clockwise rotation of the upper link shaft 80 during downward movement of the cam plate 28 relative to the housing 48. As can be seen, the desired direction of rotation of the upper link shaft 80 may be reversed by simply axially rotating the mounting orientation of the housing 48 on the actuator 12.

Referring back to FIG. 3, shown is the motion converter 10 with the housing 48 shown in a generally rectangular configuration although it should be noted that the housing 48 may be provided in any alternative arrangement including generally rounded configuration. The upper plate 60 of the housing 48 has a generally rectangular shape and includes a fastener bore 62 formed through corners of the upper plate 60. Housing fasteners 54 such as Allen screws or other suitable fasteners may be inserted through the fastener bores 62.

The fastener bores 62 may also extend through the enclosure 50 to allow threadable engagement of the housing fasteners 54 to the lower plate 18. Alternatively, it is contemplated that the enclosure 50 and lower plate 18 may be fabricated as an integral unitary structure. However, the fabrication and maintenance of the motion converter 10 may be simplified by providing the enclosure 50 and lower plate 18 as separate components. The upper plate 60 may include a counter bore formed in each one of the corners to recess the housing fasteners 54.

Referring still to FIG. 3, shown is the lower link 96 which forms part of the position detection assembly 94, as was earlier mentioned. The lower link 96 includes a pivot end 86a and a free end 88a. The lower link 96 pivot end 86a is pivotally mounted to the housing 48 via the lower link shaft 98. The lower link shaft 98 may extend upwardly from the lower link 96. The lower link shaft 98 is rotatable about a lower link axis 100 which is oriented orthogonally relative to the upper surface 36 of the cam plate 28. The upper plate 60 may include a side bore 66 as shown in FIG. 3 which may further include a shaft bearing 82 sized and configured for receiving the lower link shaft 98 therein.

Figure 6:
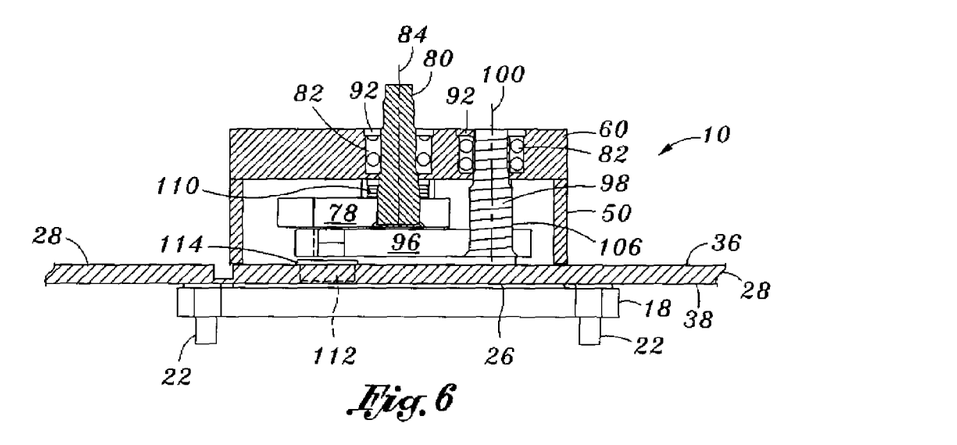
FIG. 6 is a section view of the motion converter taken along line 6-6 of FIG. 7 and illustrating the lower and upper link shafts being pivotably mounted to the upper plate and further illustrating the upper link being disposed in overlapping relationship to the lower link.

As can be seen in FIG. 6, the lower link shaft 98 may include a shaft shoulder 106. The lower link shaft 98 may optionally be countersunk into an underside of the lower link 96 to prevent interference with the cam plate 28 reciprocating therebelow. The lower link shaft 96 extends upwardly from the shaft shoulder 106 into a reduced diameter portion that is received by the shaft bearing 82. A snap ring 92 may be secured around a circumferential groove formed in an upper end of the lower link shaft 98 to restrict vertical movement of the lower link shaft 98 while allowing for rotation thereof in the shaft bearing 82. It should also be noted that although formed as separate components, the lower link 96 and the lower link shaft 98 may be formed as an integral unitary structure.

As shown in FIG. 3, the free end 88a of the lower link 96 may include a downwardly extending cam pin 102 which may be formed as a separate component from the lower link 96 or which may also be integrally formed therewith. Adjacent to the cam pin 102 is a slot 104 formed in the free end 88a and which is adapted to receive the link pin 90 of the upper link 78. As was earlier mentioned, the cam pin 102 is configured complimentary to the groove 40 and is cooperatively engageable thereto. The upper link 78 further includes a pivot end 86 and a free end 88 with the pivot end 86 of the upper link 78 being pivotally mounted to the housing 48 in offset relationship to the lower link 96 pivot end 86a.

As can be seen in FIG. 3, a center bore 64 is formed adjacent to the side bore 66 of the upper plate 60. The upper link 78 includes the upper link shaft 80 which extends upwardly from the upper link 78 and passes through the upper plate 60. As shown in FIG. 6, another one of the shaft bearings 82 is also preferably provided in the center bore 64 such that the upper link shaft 80 is rotatable therewithin. A snap 92 ring is also provided to vertically secure the upper link shaft 80 to the upper plate 60 in a manner similar to that described for the lower link shaft 98.

The upper link shaft 80 may be formed as a separate component from the upper link 78 or the two components may be formed as an integral structure. As can be seen in FIG. 3, a link pin 90 extends downwardly from an underside of the upper link 78 and is preferably sized and configured to slidably engage the slot 104 formed in the lower link 96 free end 88. The link pin 90 may be formed as a separate component from the upper link 78 or it may be integrally formed therewith.

As can be seen in FIGS. 3 and 6, the lower link 96 has a length which is generally larger than that of the upper link 78. Due to the offset nature between the upper and lower link shafts 98, 78, the amount of angular rotation of the upper link 78 is magnified when the link pin 90 of the upper link 78 follows the rotational movement of the lower link 96 slot 104 when the lower link 96 is rotated due to the cam pin 102 following in the groove 40 of a cam plate 28.

In this regard, the lower link 96 is configured to pivot about the lower link pivot end 86a in response to slidable movement of the cam pin 102 within the groove 40 within reciprocation of the cam plate 28. Likewise, the upper link 78 is also configured to pivot about the upper link pivot end 86 in response to slidable movement of the link pin 90 within the slot 104 of the lower link 96 during pivoting thereof. The upper and lower links 78, 96 are disposed in slight spaced relationship to one another in order to minimize volumetric requirements of the motion converter 10 housing 48 while eliminating any frictional concerns between the upper link 78 and lower link 96.

Although the upper link 78 shafts and lower link shaft 98s are shown as being rotatably captured in the upper plate 60 housing 48 via the shaft bearings 82, it is contemplated that the shaft bearings 82 may be altogether eliminated or replaced with bushings or other devices which will facilitate rotation of the upper link and lower link shafts 78, 98 relative to the upper plate 60.

Figure 7:
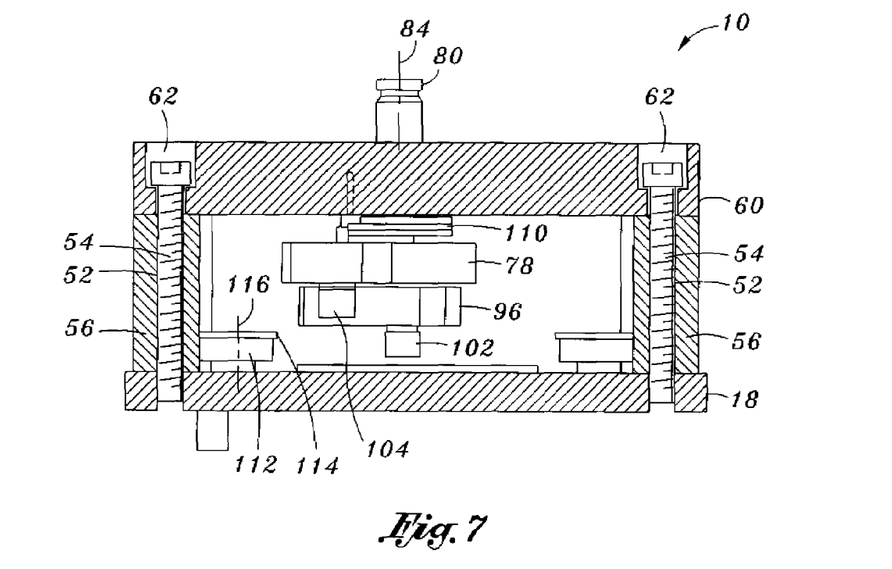
FIG. 7 is a section view of the motion converter taken along line 7-7 of FIG. 5 and illustrating the lower link having a cam pin extending downwardly therefrom for engaging the groove and the upper link having a link pin extending downwardly therefrom for engaging a slot formed in a free end of the lower link.

As shown in FIGS. 3, 6 and 7, the motion converter 10 may further comprise a spring 110 such as a torsion spring affixed between the housing 48 and the upper link 78. More specifically, as shown in FIG. 7, the spring 110 may be secured at one of its ends to the upper plate 60 on an underside thereof. An opposite end of the spring 110 may be secured to a lower side of the upper link 78. The spring 110 is preferably configured to rotatably bias the cam pin 102 against the groove 40 and, more particularly, against an opposing pair of groove sidewalls 46 that are preferably spaced complimentary to the cam pin 102.

In this manner, the spring 110 is configured to prevent lateral movement of the cam pin 102 within the groove 40 during reciprocation of the cam plate 28. Although the spring 110 that is shown in FIGS. 3, 6 and 7 is illustrated as a torsion spring 110, it is also contemplated that the spring 110 may be configured in any number of different biasing means and may be secured to the motion converter 10 in a variety of positions sufficient to bias the cam pin 102 against one of the groove sidewalls 46. In this regard, the spring 110 acts as an anti backlash device by keeping the cam pin 102 pre-loaded to one of the groove sidewalls 46.

As can be seen in FIG. 3, the lower plate 18 may include a friction pad 26 mounted thereupon in an area along which the cam plate 28 reciprocates. In order to prevent metal-to-metal contact which may compromise the free sliding of the cam plate 28 and, hence, precise rotational motion of the upper link shaft 80 in response thereto, the friction pad 26 is preferably a non-metallic material such as Teflon or other suitable material having a relatively low coefficient of friction but which is also corrosion-compatible with metallic materials from which the cam plate 28 and lower plate 18 may be fabricated.

Shown in FIGS. 3 and 5-7, the pair of rotatable plate bearings 112 are disposed on opposing sides of the cam plate 28 adjacent the earn pin 102 and are positioned in general alignment with the cam pin 102 and are in rolling contact with opposing plate sidewalls 30 of the cam plate 28. The plate bearings 112 are shown mounted on the lower plate 18 and may be journaled directly thereinto or mounted on bearing shafts affixed to the lower plate 18. Each one of the plate bearings 112 is rotatable about a bearing axis 116 which is oriented orthogonally relative to the cam plate 28. The plate bearings 112 are mounted at a spacing that is complimentary to the cam plate 28 width and are positioned to bear against the plate sidewalls 30 of the cam plate 28 to prevent transverse movement of the cam plate 28 relative to the lower plate 18 at an area of the cam pin 102. Such transverse movement may occur during reciprocation of the cam plate 28 due to lateral movement of either one of the plate ends 32.

Such transverse movement of the plate ends 32 may be induced by a device to which one of the plate ends 32 is attached. For example, a threaded rod may be used to interconnect a valve stem to the cam plate 28 at the plate end 32 as is shown in FIGS. 2A and 2B. When lateral movement at the plate ends 32 occurs such as may be induced by the threaded rod, the cam plate 28 is prevented from moving laterally in the area adjacent to the cam pin 102 due to positioning of the plate bearings 112 on both sides of the cam plate 28. In this arrangement, the cam plate 28 may only rotate slightly in the area adjacent to the cam pin 102 which prevents any noticeable lateral displacement of the cam pin 102. In this manner, any lateral movement at the plate ends 32 of the cam plate 28 does not have any adverse effect on the accuracy of rotational movement at the upper link shaft 80.

As shown in FIG. 6, each one of the plate bearings 112 preferably includes a bearing lip 114 extending circumferentially around an upper portion thereof. The bearing lip 114 is specifically configured (i.e., vertically located) to capture the cam plate 28 between the bearing lip 114 and the friction pad 26 in order to prevent vertical movement (i.e., upward floating) of the cam plate 28 during linear reciprocation thereof. It is contemplated that the plate bearings 112 are generally aligned with the cam pin 102.

However, because the cam pin 102 moves within a longitudinal range of movement during reciprocation of the cam plate 28, the plate bearings 112 are preferably positioned within the longitudinal range of movement of the cam pin 28 (i.e., along the direction of the valve axis 34) so as to minimize lateral movement of the cam plate 28 regardless of the positioning of the cam pin 102 along the diagonal portion 42 of the groove 40. As an alternative to the plate bearings 112, it is contemplated that a spaced pair of bushings and/or sliders may be mounted on the lower plate 18 at a similar positioning and orientation relative to the cam pin 102 as described above.

Figure 5:
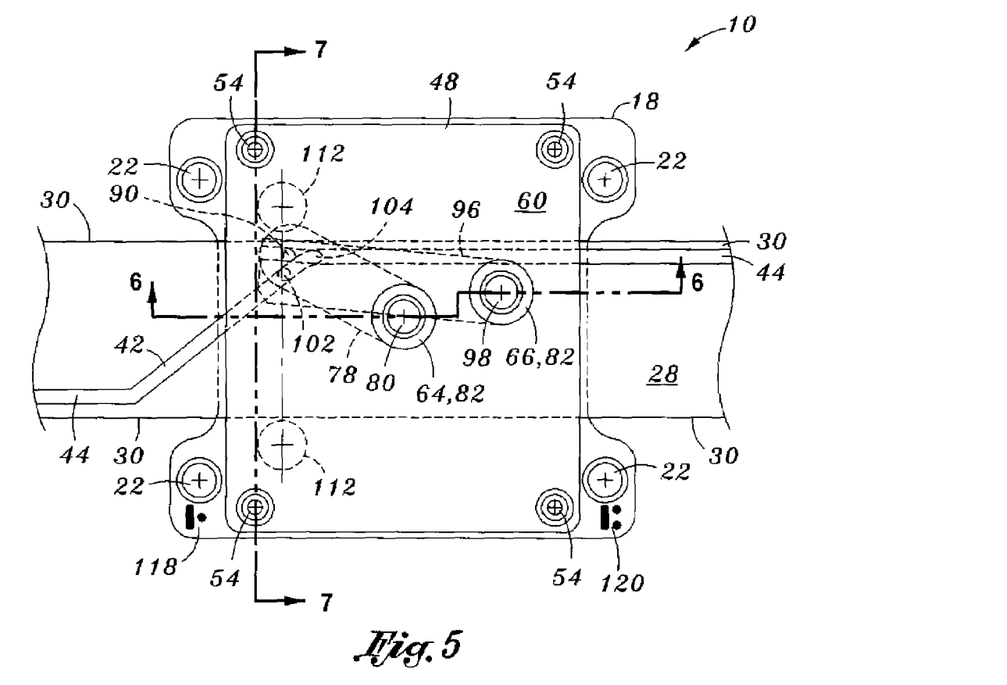
FIG. 5 is a top view of the motion converter illustrating an upper link shaft extending through an upper plate of the housing and a lower link shaft disposed in offset relationship to the upper link shaft.

Referring now to FIG. 5, shown is a pair of first and second calibration markings 118, 120 that may optionally be formed on an upper surface 36 of the lower plate 18. As can be seen in FIG. 4, a complimentary set of corresponding first and second calibration markings 118, 120 are also formed on an upper surface 36 of the lower plate 18. Calibration of the motion converter 10 is thereby facilitated by inserting the cam plate 28 with the first calibration marking 118 on a lower plate 18 being generally aligned with the first calibration marking 118 on the cam plate 28.

Likewise, the second calibration marking 120 on the lower plate 18 and on the cam plate 28 are also aligned. Because of the different configurations in the first and second calibration markings 120, incorrect insertion of the cam plate 28 is prevented. Line segments included in each one of the first and second markings on the cam plate 28 and the lower plate 18 are preferably aligned which optimally results in the cam plate 28 being inserted halfway through the housing 48. At such a position, calibration of the motion converter 10 can then be accurately performed.

Regarding materials from which the motion converter 10 may be fabricated, it is contemplated that stainless steel and/or aluminum such as anodized aluminum, or any combination thereof may be utilized. However, any other suitable metallic and/or non-metallic material or any combination thereof may be utilized. Corrosion resistance of the motion converter 10 is enhanced by fabricating most of the components from stainless steel.

Aluminum may be used to fabricate the housing 48 including the lower plate 18, enclosure 50 and upper plate 60 although stainless steel may optionally be utilized for fabricating these components. In this regard, the housing 48 is not necessarily configured to be scaled against the environment including water sealing and dirt sealing. For example, the housing 48 includes the housing openings 58 on opposing sides of the enclosure 50 and which provide a means by which water and/or dirt may enter the device.

Additional modifications and improvements of the present invention may also be apparent to those of ordinary skill in the art. Thus, the particular combination of parts described and illustrated herein is intended to represent only one embodiment of the present invention and is not intended to serve as limitations of alternative devices within the spirit and scope of the present invention.

What is claimed is:

1. A valve motion conversion device, comprising:
   a housing;
   a cam plate reciprocatable through the housing and having a groove extending diagonally across a plate width of the cam plate;
   a lower link having a pivot end and a free end, the lower link pivot end being pivotally mounted to the housing, the lower link free end having a cam pin and a slot formed adjacent thereto, the cam pin being cooperatively engaged to the groove; and
   an upper link having a pivot end and a free end, the upper link pivot end being pivotally mounted to the housing in offset relationship to the lower link pivot end, the upper link free end having a link pin cooperatively engaged to the slot;
   wherein:
      the lower link pivots about the lower link pivot end in response to slidable movement of the cam pin within the groove during reciprocation of the cam plate;
      the upper link pivots about the upper link pivot end in response to slidable movement of the link pin within the slot during pivoting of the lower link.

2. The valve motion conversion device of claim 1 wherein the housing comprises:
   a lower plate having the cam plate slidable thereagainst;
   a hollow enclosure having an opposing pair of housing openings sized complementary to the cam plate; and
   an upper plate having the lower link and upper link pivot ends journaled thereinto.

3. The valve motion conversion device of claim 2 wherein:
   the housing further comprises a pair of plate bearings mounted on the lower plate at a spacing complementary to the plate width;
   the plate bearings being configured to bear against opposing sidewalls of the cam plate to prevent transverse movement thereof relative to the lower plate.

4. The valve motion conversion device of claim 3 wherein the pair of plate bearings are generally aligned with the cam pin.

5. The valve motion conversion device of claim 3 wherein:
   each one of the plate bearings includes a bearing lip extending circumferentially around an upper edge thereof;
   the bearing lip being configured to prevent vertical movement of the cam plate during linear reciprocation thereof.

6. The valve motion conversion device of claim 2 further including a friction pad mounted on the lower plate and being configured to reduce sliding friction therebetween.

7. The valve motion conversion device of claim 1 wherein:
   the cam plate defines opposing plate ends;

the groove defining a diagonal portion extending diagonally across the plate width and having opposing diagonal ends;
the groove further including a pair of straight portions extending from respective ones of the diagonal ends toward corresponding nearest ones of the plate ends.

8. The valve motion conversion device of claim 1 wherein the groove is sized and configured to effectuate up to about ninety degrees of rotation of the upper link about the pivot end.

9. The valve motion conversion device of claim 1 further comprising:
a spring affixed at opposing ends to the housing and upper link;
wherein:
the groove defines an opposing pair of groove sidewalls spaced complementary to the cam pin;
the spring being configured to rotatably bias the cam pin against one of the groove sidewalls.

10. The valve motion conversion device of claim 1 further including an output shaft rotatably mounted on the upper link pivot end and extending upwardly through the housing for coupling a positioner thereto.

11. The valve motion conversion device of claim 2 wherein:
the lower link is mounted on a lower link shaft journaled into the upper plate;
the upper link being mounted on an upper link shaft journaled into the upper plate and protruding thereout;
the upper link shaft having a stem coupling mounted on a free end thereof.

12. The valve motion conversion device of claim 11 wherein the upper plate includes a pair of shaft bearings configured to rotatably support the upper and lower link shafts.

13. A valve motion conversion device comprising:
a generally hollow housing;
an elongate cam plate linearly reciprocatable within the housing along a longitudinal axis and having a groove formed in an upper surface of the cam plate and being oriented diagonally relative to the longitudinal axis;
a lower link having a pivot end and a free end, the lower link pivot end being pivotally mounted to the housing about a lower link axis and being oriented orthogonally relative to the longitudinal axis and the upper surface, the lower link free end having a downwardly protruding cam pin and a slot formed adjacent thereto, the cam pin being slidably engageable to the groove; and
an upper link having a pivot end and a free end, the upper link pivot end being pivotally mounted to the housing about an upper link axis and being oriented parallel to the lower link axis in offset relationship thereto, the upper link free end having a downwardly protruding link pin slidably engageable to the slot;
an output shaft coupled to the upper link pivot end and extending upwardly through the housing;
wherein:
the lower link pivots about the lower link pivot end in response to movement of the cam pin within the groove during reciprocation of the cam plate;
the upper link pivots about the upper link pivot end in response to movement of the link pin within the slot during pivoting of the lower link to effectuate rotation of the output shaft.

14. The valve motion conversion device of claim 13 wherein the housing comprises:
a lower plate having the cam plate slidable thereagainst;
an enclosure having a pair of housing openings sized complementary to a cross-section of the cam plate; and
an upper plate having the lower link and upper link pivot ends being journaled thereinto.

15. The valve motion conversion device of claim 14 wherein:
the housing further comprises a pair of plate bearings mounted on the lower plate at a spacing complementary to the plate width;
the plate bearings being configured to bear against opposing sidewalls of the cam plate to prevent transverse movement of the cam plate relative to the lower plate.

16. The valve motion conversion device of claim 13 wherein the groove is sized and configured to effectuate up to about ninety degrees of rotation of the upper link about the pivot end.

17. The valve motion conversion device of claim 13 further comprising:
a spring affixed at opposing ends to the housing and upper link;
wherein:
the groove defines an opposing pair of groove sidewalls spaced complementary to the cam pin;
the spring being configured to rotatably bias the cam pin against one of the groove sidewalls to prevent lateral movement of the cam pin within the groove.

18. The valve motion conversion device of claim 13 wherein:
the lower link is mounted on a lower link shaft journaled into the upper plate;
the upper link being mounted on an upper link shaft journaled into the upper plate and protruding thereout;
the output shaft being coupled to the upper link shaft.

19. The valve motion conversion device of claim 13 wherein the output shaft is coupled to the positioner.

20. The valve motion conversion device of claim 13 wherein:
the cam plate defines opposing plate ends;
at least one of the plate ends being coupled to a valve.

* * * * *